US009412201B2

(12) United States Patent
Kinnebrew et al.

(10) Patent No.: US 9,412,201 B2
(45) Date of Patent: Aug. 9, 2016

(54) MIXED REALITY FILTERING

(71) Applicant: Microsoft Technology Licensing, LLC, Redmond, WA (US)

(72) Inventors: Peter Tobias Kinnebrew, Seattle, WA (US); Nicholas Kamuda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

(21) Appl. No.: 13/747,297

(22) Filed: Jan. 22, 2013

(65) Prior Publication Data

US 2014/0204117 A1     Jul. 24, 2014

(51) Int. Cl.
G09G 5/00 (2006.01)
G06T 19/00 (2011.01)
G06F 3/14 (2006.01)
G06F 17/30 (2006.01)

(52) U.S. Cl.
CPC ............. G06T 19/006 (2013.01); G06F 3/14 (2013.01); G06F 17/30058 (2013.01); G06F 17/30994 (2013.01)

(58) Field of Classification Search
CPC ............ G06T 19/006; G06F 17/30058; G06F 17/30994; G06F 3/14
USPC .......................................................... 345/633
See application file for complete search history.

(56) References Cited

U.S. PATENT DOCUMENTS

| 6,972,734 | B1 | 12/2005 | Ohshima et al. |
| 7,564,469 | B2 | 7/2009 | Cohen |
| 7,933,897 | B2* | 4/2011 | Jones et al. .................... 707/723 |
| 8,121,867 | B2* | 2/2012 | Gamage et al. ................... 705/3 |
| 8,643,675 | B2* | 2/2014 | Mlejnek et al. ................ 345/632 |
| 8,810,598 | B2* | 8/2014 | Soon-Shiong ................ 345/633 |
| 2009/0167787 | A1* | 7/2009 | Bathiche et al. .............. 345/633 |
| 2010/0103196 | A1 | 4/2010 | Kumar et al. |
| 2010/0253700 | A1 | 10/2010 | Bergeron |
| 2011/0029903 | A1 | 2/2011 | Schooleman et al. |
| 2011/0248905 | A1* | 10/2011 | Chosokabe et al. .............. 345/7 |
| 2011/0270522 | A1 | 11/2011 | Fink |
| 2012/0038669 | A1* | 2/2012 | Lee et al. ....................... 345/633 |
| 2012/0194541 | A1 | 8/2012 | Kim et al. |
| 2012/0256954 | A1 | 10/2012 | Soon-Shiong |

OTHER PUBLICATIONS

Lemordant, Jacques, "Mixed Reality Browsers", Retrieved at <<http://wam.inrialpes.fr/publications/2011/ARWorshopBarcelona2011.pdf>>, Feb. 2011, pp. 4.

(Continued)

Primary Examiner — Barry Drennan
Assistant Examiner — Robert Craddock
(74) Attorney, Agent, or Firm — Dan Choi; Judy Yee; Micky Minhas

(57) ABSTRACT

Embodiments that relate to selectively filtering geo-located data items in a mixed reality environment are disclosed. For example, in one disclosed embodiment a mixed reality filtering program receives a plurality of geo-located data items and selectively filters the data items based on one or more modes. The modes comprise one or more of a social mode, a popular mode, a recent mode, a work mode, a play mode, and a user interest mode. Such filtering yields a filtered collection of the geo-located data items. The filtered collection of data items is then provided to a mixed reality display program for display by a display device.

18 Claims, 6 Drawing Sheets

(56) References Cited

OTHER PUBLICATIONS

Correia, et al., "Storing and Replaying Experiences in Mixed Environments using Hypermedia", Retrieved at <<http://www.ii.ist.i.kyoto-u.ac.jp/~sumi/pervasive04/program/Correia.pdf>>, Memory and Sharing of Experiences Workshop, Pervasive 2004 Conference, Vienna, Austria, Apr. 2004, pp. 5.

ISA Korean Intellectual Property Office, International Search Report and Written Opinion Issued in PCT Patent Application No. PCT/US2014/011560, Feb. 16, 2015, WIPO, 11 Pages.

European Patent Office, Supplementary Search Report Issued in European Patent Application No. 14704202.2, Nov. 11, 2015, Germany, 3 pages.

European Patent Office, Office Action Issued in European Patent Application No. 14704202.2, Nov. 20, 2015, Germany, 5 pages.

* cited by examiner

MIXED REALITY FILTERING

BACKGROUND

Augmented or mixed reality devices may be used in a variety of real-world environments and contexts. Such devices may provide a user with a real-time view of the physical world surrounding the user, and may augment the view with holographic objects and other virtual reality information.

Large amounts of virtual reality information may be available for presentation to a user. Some of this information may be associated with a particular location that may be within view of the user. With so much virtual reality information available, managing the presentation of this information to a user, and the user's interaction with such information, can prove challenging. Presenting too much virtual reality information may clutter a user's experience of a mixed reality environment and overwhelm the user, making the information difficult to process. Additionally, in some cases the user may be interested in viewing only a small portion of the total amount of virtual reality information available. Further, even when a smaller portion of the available virtual reality information is presented, the amount of information and manner of presentation may still create a user experience that is less than desirable.

SUMMARY

Various embodiments are disclosed herein that relate to presenting a filtered collection of geo-located data items in a mixed reality environment via a display device. For example, one disclosed embodiment provides a method for selectively filtering a plurality of geo-located data items that include geo-located hologram items and other geo-located data items in a mixed reality environment. The method includes receiving the plurality of geo-located data items and selectively filtering the data items based on one or more modes. The modes comprise one or more of a social mode, a popular mode, a recent mode, a work mode, a play mode, and a user interest mode. Such filtering yields a filtered collection of the geo-located data items. The filtered collection of data items is then provided to a mixed reality display program for display by a display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
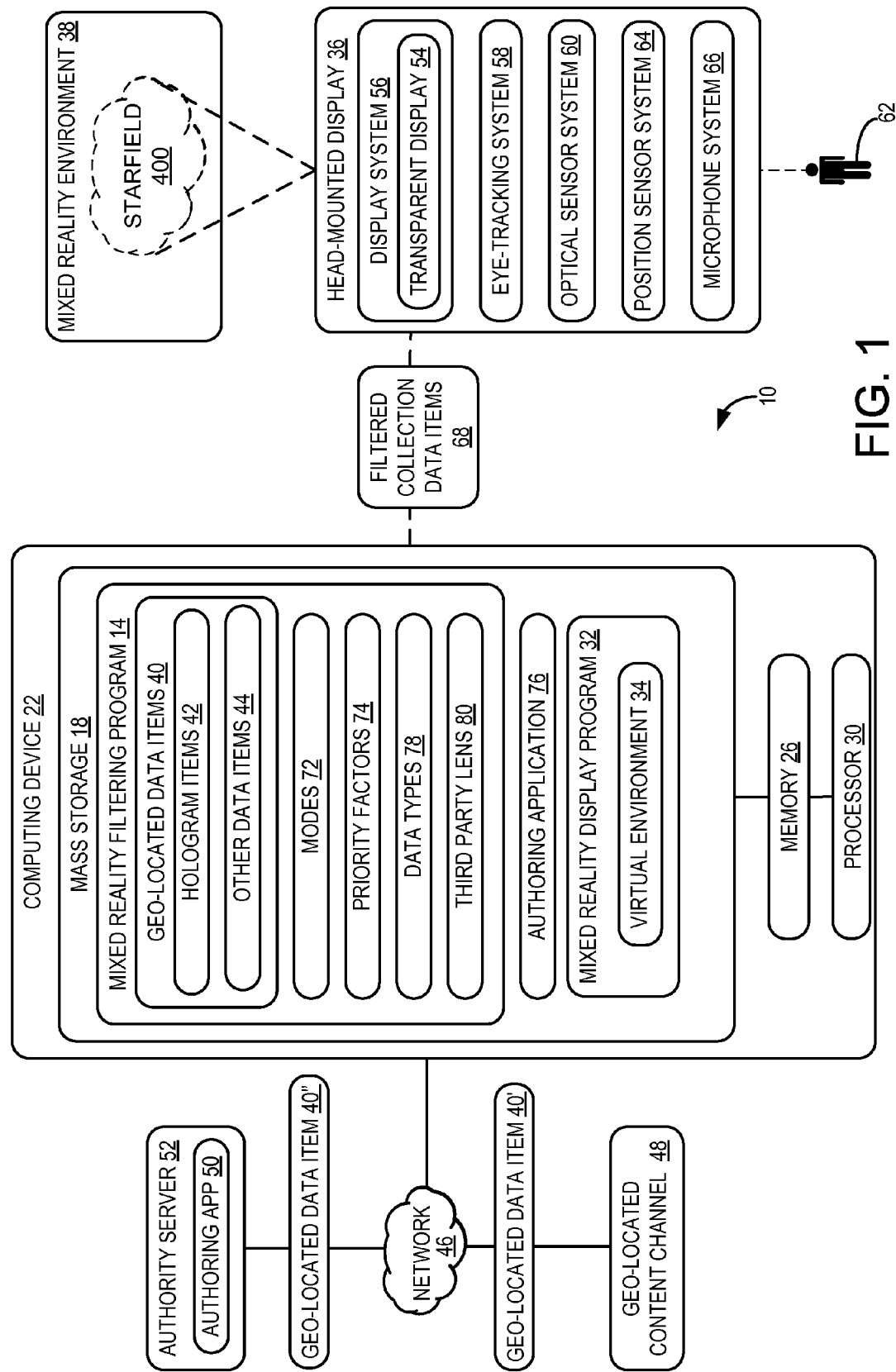
FIG. 1 is a schematic view of a mixed reality filtering system according to an embodiment of the present disclosure.

FIG. 1 shows a schematic view of one embodiment of a mixed reality filtering system 10. The mixed reality filtering system 10 includes a mixed reality filtering program 14 that may be stored in mass storage 18 of a computing device 22. The mixed reality filtering program 14 may be loaded into memory 26 and executed by a processor 30 of the computing device 22 to perform one or more of the methods and processes described in more detail below.

The mixed reality filtering system 10 includes a mixed reality display program 32 that may generate a virtual environment 34 for display on a display device, such as the head-mounted display (HMD) device 36, to create a mixed reality environment 38. The virtual environment 34 includes a plurality of geo-located data items 40. Such data items 40 may include one or more virtual images, such as geo-located, three-dimensional hologram items 42 and other geo-located data items 44, such as geo-located two-dimensional virtual objects.

In one example, and as described in more detail below, one or more geo-located data items 40' may be received by the computing device 22 via a network 46 from a geo-located content channel 48. In another example, one or more geo-located data items 40" may be generated by an authoring application 50 located on an authority server 52. Such geo-located data item 40" may also be received by the computing device 22 via network 46.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 7.

The computing device 22 may be operatively connected with the HMD device 36 using a wired connection, or may employ a wireless connection via WiFi, Bluetooth, or any other suitable wireless communication protocol. Additionally, the example illustrated in FIG. 1 shows the computing device 22 as a separate component from the HMD device 36. It will be appreciated that in other examples the computing device 22 may be integrated into the HMD device 36.

Figure 2:
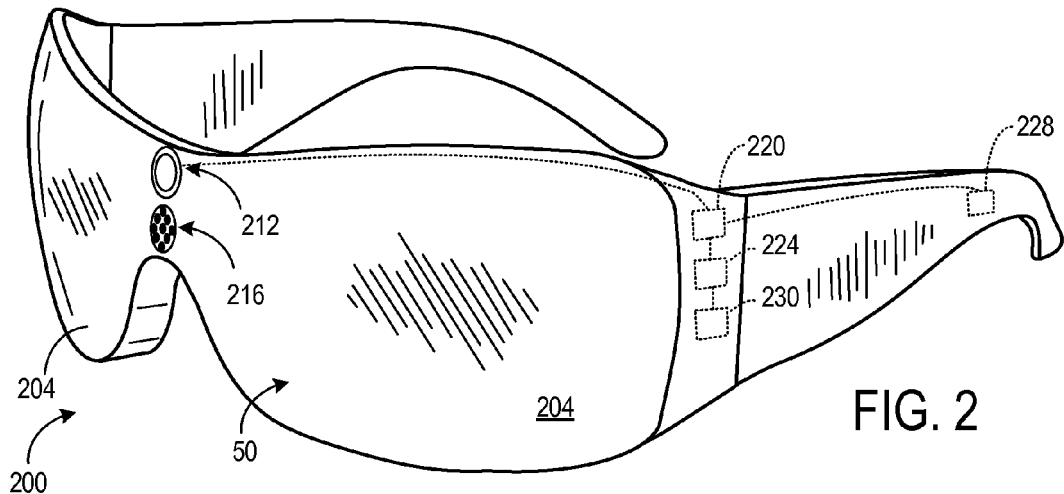
FIG. 2 shows an example head-mounted display device according to an embodiment of the present disclosure.

With reference now also to FIG. 2, one example of an HMD device 200 in the form of a pair of wearable glasses with a transparent display 54 is provided. It will be appreciated that in other examples, the HMD device 200 may take other suitable forms in which a transparent, semi-transparent or non-transparent display is supported in front of a viewer's eye or eyes. It will also be appreciated that the HMD device 36 shown in FIG. 1 may take the form of the HMD device 200, as described in more detail below, or any other suitable HMD device. Additionally, many other types and configurations of display devices having various form factors may also be used within the scope of the present disclosure. Such display devices may include, but are not limited to, hand-held smart phones, tablet computers, and other suitable display devices.

With reference to FIGS. 1 and 2, in this example the HMD device 36 includes a display system 56 and transparent display 54 that enables images such as holographic objects to be delivered to the eyes of a user 62. The transparent display 54 may be configured to visually augment an appearance of a physical environment to a user 62 viewing the physical environment through the transparent display. For example, the appearance of the physical environment may be augmented by graphical content (e.g., one or more pixels each having a respective color and brightness) that is presented via the transparent display 54 to create a mixed reality environment 38.

The transparent display 54 may also be configured to enable a user to view a physical, real-world object in the physical environment through one or more partially transparent pixels that are displaying a virtual object representation. In one example, the transparent display 54 may include image-producing elements located within lenses 204 (such as, for example, a see-through Organic Light-Emitting Diode (OLED) display). As another example, the transparent display 54 may include a light modulator on an edge of the lenses 204. In this example the lenses 204 may serve as a light guide for delivering light from the light modulator to the eyes of a user. Such a light guide may enable a user to perceive a 3D holographic image located within the physical environment that the user is viewing, while also allowing the user to view physical objects in the physical environment.

The HMD device 36 may also include various sensors and related systems. For example, the HMD device 36 may include an eye-tracking sensor system 58 that utilizes at least one inward facing sensor 216. The inward facing sensor 216 may be an image sensor that is configured to acquire image data in the form of eye-tracking information from a user's eyes. Provided the user has consented to the acquisition and use of this information, the eye-tracking sensor system 58 may use this information to track a position and/or movement of the user's eyes.

The HMD device 36 may also include sensor systems that receive physical environment data from the physical environment. For example, the HMD device 36 may include an optical sensor system 60 that utilizes at least one outward facing sensor 212, such as an optical sensor. Outward facing sensor 212 may detect movements within its field of view, such as gesture-based inputs or other movements performed by a user 62 or by a person or physical object within the field of view. Outward facing sensor 212 may also capture two-dimensional image information and depth information from a physical environment and physical objects within the environment. For example, outward facing sensor 212 may include a depth camera, a visible light camera, an infrared light camera, and/or a position tracking camera.

The HMD device 36 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of the physical environment in which a user 62 is situated. In one example, the mixed reality display program 32 may include a 3D modeling system that uses such input to generate the virtual environment 34 that models the physical environment surrounding the user.

The HMD device 36 may also include a position sensor system 64 that utilizes one or more motion sensors 224 to enable position tracking and/or orientation sensing of the HMD device. For example, the position sensor system 64 may be utilized to determine a head pose orientation of a user's head. In one example, position sensor system 64 may comprise an inertial measurement unit configured as a six-axis or six-degree of freedom position sensor system. This example position sensor system may, for example, include three accelerometers and three gyroscopes to indicate or measure a change in location of the HMD device 36 within three-dimensional space along three orthogonal axes (e.g., x, y, z), and a change in an orientation of the HMD device about the three orthogonal axes (e.g., roll, pitch, yaw).

Position sensor system 64 may also support other suitable positioning techniques, such as GPS or other global navigation systems. Further, while specific examples of position sensor systems have been described, it will be appreciated that other suitable position sensor systems may be used.

In some examples, motion sensors 224 may also be employed as user input devices, such that a user may interact with the HMD device 36 via gestures of the neck and head, or even of the body. The HMD device 36 may also include a microphone system 66 that includes one or more microphones 220. In other examples, audio may be presented to the user via one or more speakers 228 on the HMD device 36.

The HMD device 36 may also include a processor 230 having a logic subsystem and a storage subsystem, as discussed in more detail below with respect to FIG. 7, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 54.

It will be appreciated that the HMD device 36 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 36 may include additional and/or alternative sensors, cameras, microphones, input devices, output devices, etc. without departing from the scope of this disclosure. Further, the physical configuration of the HMD device 36 and its various sensors and subcomponents may take a variety of different forms without departing from the scope of this disclosure.

Figure 3:
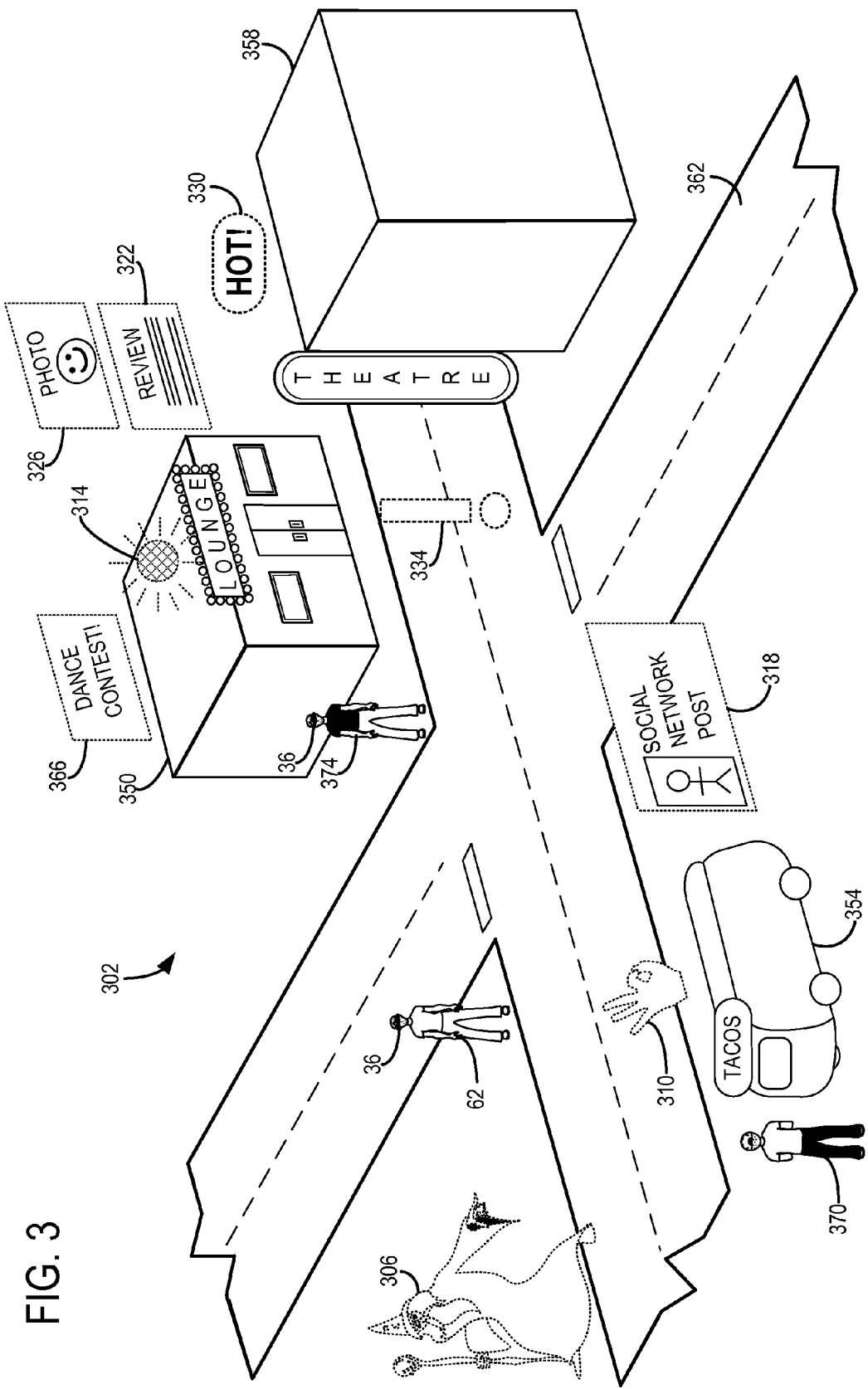
FIG. 3 is a schematic illustration of two users wearing the head-mounted display device of FIG. 2 and viewing an example mixed reality environment according to an embodiment of the present disclosure.
Figure 4:
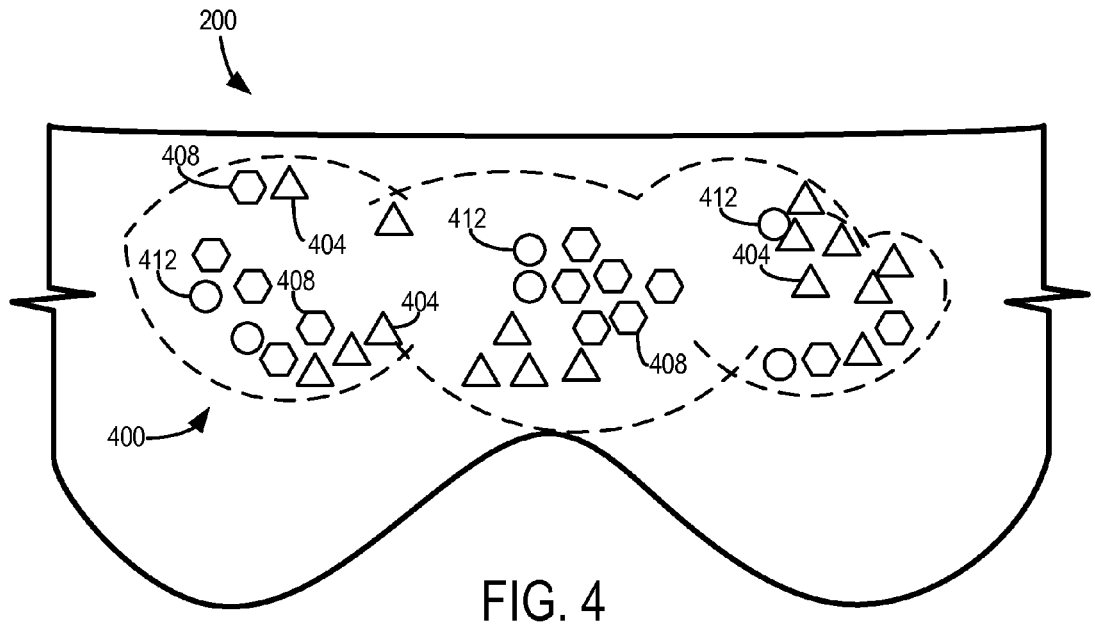
FIG. 4 is a schematic view of a starfield depicting a data item density as seen through a head-mounted display device.
Figure 5:
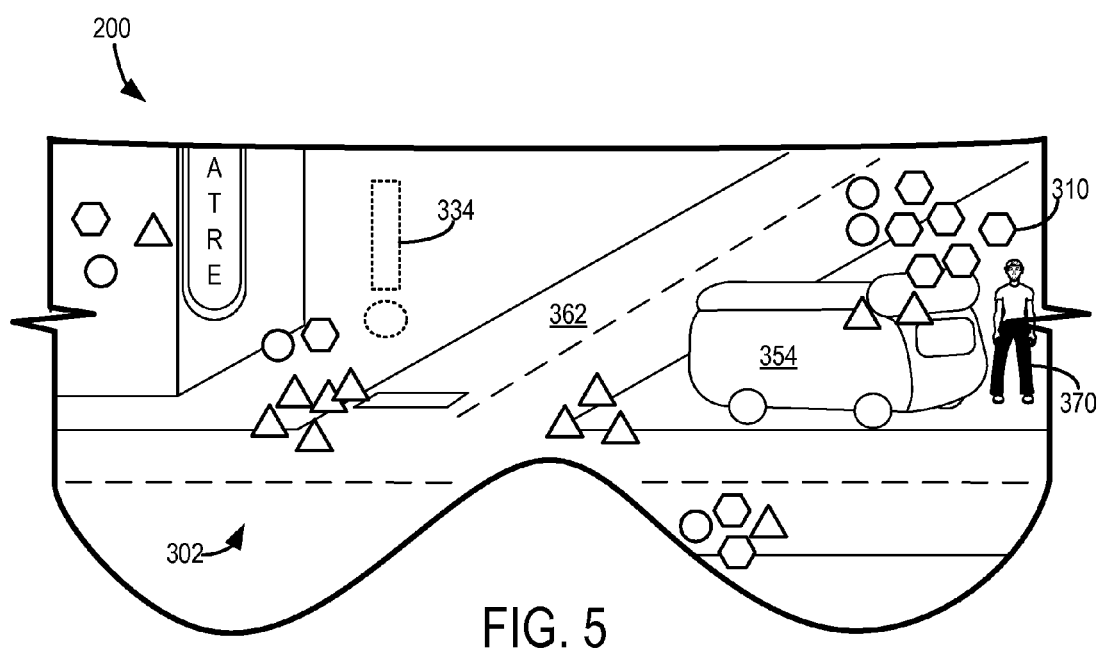
FIG. 5 is a schematic view of a data item starfield displayed within the mixed reality environment of FIG. 3 as viewed by a user through the head-mounted display device.

With reference now to FIGS. 3, 4 and 5, descriptions of example use cases and embodiments of the mixed reality filtering system 10 will now be provided. FIG. 3 is a schematic illustration of a user 62 wearing HMD device 36 and viewing through the device a physical environment 302 in the form of a city intersection. In this example the HMD device 36 takes the form of HMD device 200.

As viewed by the user 62, and with reference also to FIG. 1, the virtual environment 34 combines with the physical environment 302 to create the mixed reality environment 38. The mixed reality environment 38 includes geo-located data items 40 that are associated with particular locations within the physical environment 302. In this example and with reference to FIG. 3, such geo-located data items 40 include a holographic wizard 306, recommendation icons 310 and 314, a social network post 318, a customer review 322, a photo 326, a popularity icon 330, and an alert icon 334.

As explained in more detail below, numerous additional geo-located data items 40 may also be associated with locations within physical environment 302. In various examples such additional geo-located data items 40 may number in the tens, hundreds, thousands or more. Where a large number of additional geo-located data items 40 are present, it will be appreciated that displaying all such data items may overwhelm the user 62, make the information difficult to process, and/or create undesirable visual clutter that degrades the user's perception of the physical environment 302. Advantageously, and as explained in more detail below, the mixed reality filtering system 10 of the present disclosure creates a filtered collection of geo-located data items that enables a user to easily locate and navigate among data items relevant to the user, thereby providing an improved user experience.

In one example, the mixed reality filtering program 14 is configured to selectively filter a plurality of geo-located data items 40 based on one or more modes 72 to yield a filtered collection of the geo-located data items 68. The filtered collection 68 may then be provided to the mixed reality display program 32 for display by the HMD device 36. In one example, the mixed reality filtering program 14 may utilize a social mode that filters the plurality of geo-located data items 40 to yield those data items that are associated with a friend, family member, or other social acquaintance of the user 62.

With reference to FIG. 3, in one example a first friend 370 of the user 62 may have previously visited the lounge 350 and left recommendation icon 314 associated with the lounge to indicate the friend's approval of the lounge. A second friend 374 of the user 62 may have lunched at the food cart 354 and left recommendation icon 310 to indicate this friend's endorsement of the food cart. While in the social mode, in this example the mixed reality filtering program 14 may include only the recommendation icons 310 and 314 in the filtered collection of data items 68 that are displayed to the user 62 via the HMD device 36.

Additionally and as shown in FIG. 3, each recommendation icon 310 and 314 may also take a different form that associates the icon with the first friend 370 and the second friend 374, respectively. It will be appreciated that many other types of data items that are associated with a friend, family member, or other social acquaintance of the user may also be included in this filtered collection of data items 68.

In another example, the mixed reality filtering program 14 may utilize a popular mode that filters the plurality of geo-located data items 40 to yield those data items that are associated with at least a threshold popularity level. With reference again to FIG. 3, the theatre 358 may be hosting a musical that is receiving rave reviews from critics in the local media, attendees' blogs, commentary via social media and other online sources, with such reviews averaging 3.9 stars out of 4 stars. In one example, the threshold popularity level may correspond to an average review of 3 stars out of 4 stars. As the reviews for the musical average 3.9 stars, while in the popular mode the mixed reality filtering program 14 may include the popularity icon 330 in the filtered collection of data items 68. The mixed reality filtering program 14 may display the popularity icon 330 above the theatre 358 to indicate that a popular event is associated with the theatre. It will be appreciated that many other types of data items that are associated with at least a threshold popularity level may also be included in this filtered collection of data items 68.

In another example, the mixed reality filtering program 14 may utilize a recent mode that filters the plurality of geo-located data items 40 to yield those data items that have been created or updated within a threshold time frame. With reference again to FIG. 3, the customer review 322 of the lounge 350 may have been posted just one hour ago. In one example, the threshold timeframe may be within the last week. As the customer review 322 of the lounge 350 was posted one hour ago, while in the recent mode the mixed reality filtering program 14 may include the customer review 322 in the filtered collection of data items 68, and may display the review next to the lounge 350. It will be appreciated that many other types of data items that have been created or updated within a threshold time frame may also be included in this filtered collection of data items 68.

In another example, the mixed reality filtering program 14 may utilize a work mode that filters the plurality of geo-located data items 40 to yield those data items that are relevant to the user's work life. With reference again to FIG. 3, the user 62 may work in commercial real estate, and a colleague of the user may have posted the social network post 318 regarding a potential leasing opportunity at that particular city intersection. While in the work mode the mixed reality filtering program 14 may include the social network post 318 in the filtered collection of data items 68, and may display the post at the street address corresponding to the potential leasing opportunity. It will be appreciated that many other types of data items that are relevant to the user's work life may also be included in this filtered collection of data items 68.

In another example, the mixed reality filtering program 14 may utilize a play mode that filters the plurality of geo-located data items 40 to yield those data items that relate to leisure, entertainment and/or other recreational activities. With reference again to FIG. 3, the lounge 350 may host regular swing dance events. An attendee of a swing dance event at the lounge 350 may have posted a photograph 326 of people dancing at the event. While in the play mode the mixed reality filtering program 14 may include the photograph 326 in the filtered collection of data items 68, and may display the photograph next to the lounge 350. It will be appreciated that many other types of data items that relate to leisure, entertainment and/or other recreational activities may also be included in this filtered collection of data items 68.

In another example, the mixed reality filtering program 14 may utilize a user interest mode that filters the plurality of geo-located data items 40 to yield those data items that relate to one or more interests of the user. With reference again to FIG. 3, the user 62 may appreciate and enjoy holographic art. In one example, the mixed reality filtering program 14 may discern this interest from the user's use of a holographic object creation program and the user's frequent online commentary regarding holographic art. While in the user interest mode the mixed reality filtering program 14 may include the holographic wizard 306 in the filtered collection of data items 68, and may display the holographic wizard 306 at a location designated by its creator. It will be appreciated that many other types of data items that relate to one or more interests of the user may also be included in this filtered collection of data items.

It will be appreciated that the user 62 may select one or more of the above-described modes for use by the mixed reality filtering program 14 as described above. It will also be appreciated that other modes in addition to those describe above may be used by the mixed reality filtering program 14 to selectively filter the plurality of geo-located data items.

The mixed reality filtering program 14 may also prioritize the filtered collection of data items 68 based on one or more priority factors 74. Once prioritized, the mixed reality filtering program 14 may provide a predetermined number of the prioritized geo-located data items to the mixed reality display program 32 for display via the HMD device 36.

In one example an item age priority factor may be used to prioritize data items according to the most recent data items. For example, where multiple reviews of the lounge 350 are available, only the most recent review 322 of the lounge 350 may be displayed via the HMD device 36. In other examples, the predetermined number of prioritized geo-located reviews may be 2, 3, 4, 5 or more, and such predetermined number of reviews may be displayed.

In another example an item rating priority factor may be used to prioritize data items according to those items receiving the most favorable ratings from commercial reviews, social graph recommendations, etc. For example, the holographic wizard 306 may have received ratings from holographic art critics and friends of the user 62 that average 7.5 stars out of 10 stars. Other holographic art creations near the user 62 may have average ratings less than 7.5 stars. Accordingly, where only the highest rated holographic art creation is to be displayed, only the holographic wizard 306 may be displayed via the HMD device 36. In other examples, the predetermined number of prioritized geo-located holographic art creations may be 2, 3, 4, 5 or more, and such number of holographic art creations may be displayed.

In another example user preference data may be used to prioritize data items. For example, by examining the user's history of creating holographic fantasy characters and indicating the user's approval ("liking") of other holographic fantasy characters, the mixed reality filtering program 14 may determine that the user has a preference for holographic fantasy characters. Accordingly, the mixed reality filtering program may prioritize the display of the holographic wizard 306 over a holographic abstract art creation that is also geo-located near the user 62.

In another example item popularity may be used to prioritize data items. For example, the popularity of a data item may correspond to the number of different comments, reviews, indications of approval, etc. received by the data item. With respect to FIG. 3, the holographic wizard 306 may have received 550 comments, reviews and indications of approval. A holographic abstract art creation may have received 50 comments, reviews and indications of approval. Accordingly, the mixed reality filtering program may prioritize the display of the holographic wizard 306 over a holographic abstract art creation based on the higher popularity of the wizard as compared to the abstract art creation.

In another example item source authority may be used to prioritize data items. With reference to FIG. 1, in one example a local government agency may operate an authority server 52 that includes an authoring application 50 that may create and serve geo-located data items 40" to the mixed reality filtering program 14. With reference now to FIG. 3, road construction may have closed one lane of the street 362 two blocks from the intersection. An alert icon 334 may be generated and geo-located at the intersection to warn drivers and pedestrians of the lane closure down the street. The local government agency may have authority to display geo-located data items via the HMD device 36, and the mixed reality filtering program 14 may accord such items priority over other data items. Accordingly, the mixed reality filtering program may prioritize the display of the alert icon 334 based on the authority of the local government agency.

In another example commercial precedence may be used to prioritize data items. In one example the lounge 350 may pay $1000 to purchase a holographic advertisement 366 promoting a dance contest at the lounge. The food cart 354 may pay $25 to purchase a holographic advertisement (not shown) promoting the food cart. As the lounge 350 paid more for its advertisement than the food cart 354, the dance contest advertisement 366 may be displayed via the HMD device 36 while the food cart advertisement may not be displayed.

In another example physical proximity to the user 62 may be used to prioritize data items. In one example the user 62 may specify a priority distance from the user within which geo-located data items are prioritized over geo-located data items located beyond such distance. For example, where the user 62 specifies a priority distance of 10 feet, holographic characters from an interactive game being played by a first friend 370 standing 20 feet away and across the street from the user may not be displayed via the HMD device 36. When the user 62 walks across the street to within 10 feet of the first friend 370, the holographic characters from the interactive game will now be prioritized and displayed.

In another example social proximity to the user 62 may be used to prioritize data items. In one example the user 62 may have a social graph that includes the first friend 370 with whom the user 62 interacts via social networking at least once per day on average. The social graph of the user 62 may also include a second friend 374 with whom the user 62 interacts via social networking once per month on average. Accordingly, the mixed reality filtering program 14 may prioritize the geo-located data items generated by the first friend 370 over those created by the second friend 374 based on the user's more frequent interactions with the first friend.

The mixed reality filtering program 14 may also be configured to enable and disable one or more authoring applications that are configured to provide one or more geo-located data items to the mixed reality display program 32 for display by the HMD device 36. One or more authoring applications 76 may be resident in the mass storage 18 of the computing device 22, or may be external to the computing device, such as the authoring application 50 located on the authority server 52 illustrated in FIG. 1.

In one example and to minimize possible distractions, the mixed reality filtering program 14 may disable the authoring application 76 when the user 62 approaches a busy street with many cars driving past the user. In another example, the authority server 52 hosting the authoring application 50 may be operated by an airport security office. When the user 62 enters the airport and crosses into a geo-fenced boundary defined by the interior of the airport building, the mixed reality display program 32 may enable the authoring application 50 to provide geo-located data items to the mixed reality display program 32 for display via the HMD device 36.

The mixed reality filtering program 14 may also be configured to selectively filter geo-located data items based on one or more data types 78 to yield the filtered collection of geo-located data items 68. Data types 78 may include, but are not limited to, social networking posts, reviews and recommendations, photographs, advertisements, and artwork. For example, the user 62 may desire to see only geo-located data items corresponding to social networking posts. Accordingly, the user may select the social networking post data type, and the mixed reality filtering program 14 may correspondingly filter all geo-located data items 40 to yield only social networking posts in the filtered collection of data items 68 provided to the HMD device 36. It will be appreciated that many other data types of geo-located data items may also be used to filter geo-located data items and are within the scope of the present disclosure.

In another example, the mixed reality filtering program 14 may be further configured to selectively filter geo-located data items based on one or more third party lenses 80 that apply third party filtering criteria. For example, the user 62 may admire the art and style sensibilities of the user's first friend 370. The user's first friend 370 may have a First Friend Art & Style lens that applies filtering criteria to geo-located data items to yield a collection of data items that reflect the first friend's art and style sensibilities.

The user 62 may receive the First Friend Art & Style lens from the first friend 370, and this lens may be stored in mass storage 18 of the computing device 22. The mixed reality filtering program 14 may then employ the First Friend Art & Style lens to selectively filter geo-located data items to yield a collection of items that reflect the first friend's art and style sensibilities. It will be appreciated that in other examples other third party lenses 80 may be received and/or purchased by the user 62.

In another example, the mixed reality filtering program 14 may be further configured to receive the plurality of geo-located data items from a geo-located content channel 48 when the HMD device 36 is located within a bounded environment serviced by the geo-located content channel. For example, the user 62 and first friend 370 may be sitting in the lounge 350. The lounge 350 may broadcast a geo-located content channel 48 that is accessible when a display device is located within the four walls of the lounge. Advantageously, the user 62 and first friend 370 may both set their HMD devices 36 to receive and display only geo-located data items broadcast by the lounge's geo-located content channel 48. Advantageously, in this manner the user 62 and first friend 370 can ensure that they are both experiencing a similar mixed reality environment, which may enhance their interactions.

In another example, the user 62 and first friend 370 may create an ad-hoc geo-located content channel that enables the user and first friend to share geo-located data items in a common mixed reality experience. In this manner, the user 62 and first friend 370 may also ensure that they are both experiencing a similar mixed reality environment, which may enhance their interactions.

In another example, and with reference now to FIGS. 4 and 5, the mixed reality filtering program 14 may be further configured to present the filtered collection of the geo-located data items 68 in a starfield 400 that depicts a data item density in the mixed reality environment 38. The starfield 400 includes a plurality of indicators that each represents a different one of the geo-located data items in the filtered collection of data items 68. Advantageously, and as schematically illustrated in FIG. 4, the starfield 400 provides a user with a conveniently abstracted representation of the density and location of geo-located data items within the current view of the user via the HMD device 36.

In one example, each of the indicators in the starfield 400 may correspond to one of a plurality of data types 78. The mixed reality filtering program 14 may be further configured to provide each of the plurality of indicators with a data type characteristic that identifies the corresponding data type from the plurality of data types. For example, the data type characteristic may comprise a particular shape of the corresponding indicator. With reference now to FIG. 4, indicators 404 having a triangular or pyramid shape may correspond to a social networking post data type. Indicators 408 having a hexagon or hexahedron shape may correspond to a review or recommendation data type. Indicators 412 having a circular or spherical shape may correspond to a photograph data type.

FIG. 5 schematically illustrates a data item starfield as viewed by the user 62 of FIG. 3 through the HMD device 36. In this example, the data item starfield is displayed within the mixed reality environment 38 that includes the physical environment 302 of the city intersection. The user 62 may have selected a social mode that selectively filters the plurality of geo-located data items 40 to yield those items associated with a friend, family member, or other social acquaintance of the user 62. Accordingly, various indicators that represent social networking posts, reviews or recommendations, and photographs associated with social acquaintances of the user 62 are included within the starfield.

For example, the starfield may include the recommendation icon 310 left by the second friend 374 next to the food cart 354. In one example, the user 62 may select the recommendation icon 310 via interaction with the HMD device 36. Upon selection, the icon 310 may expand to display the full written recommendation of the second friend 374 associated with the icon.

Figure 6A:
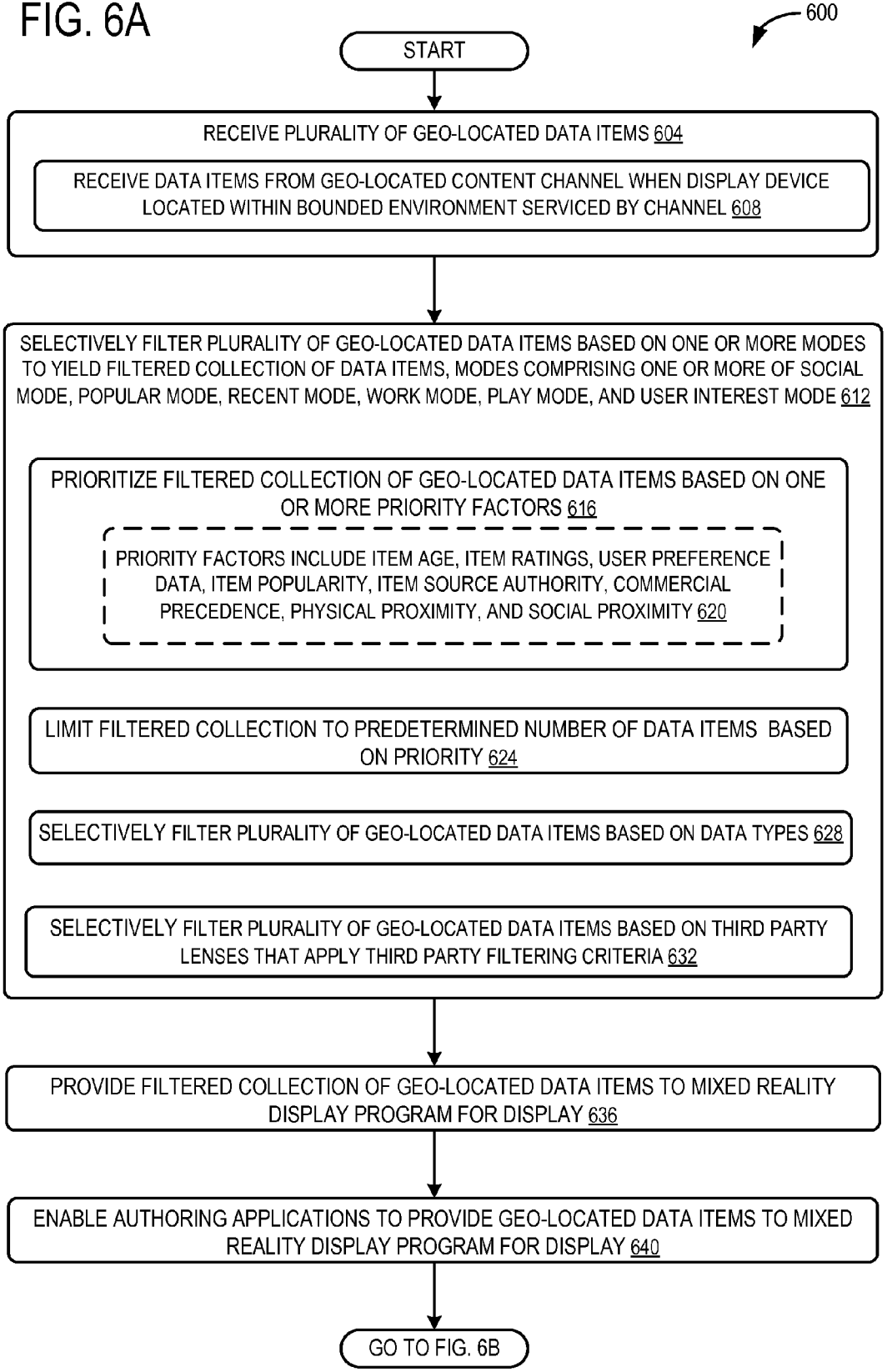
FIGS. 6A and 6B are a flow chart of a method for selectively filtering a plurality of geo-located data items according to an embodiment of the present disclosure.
Figure 6B:
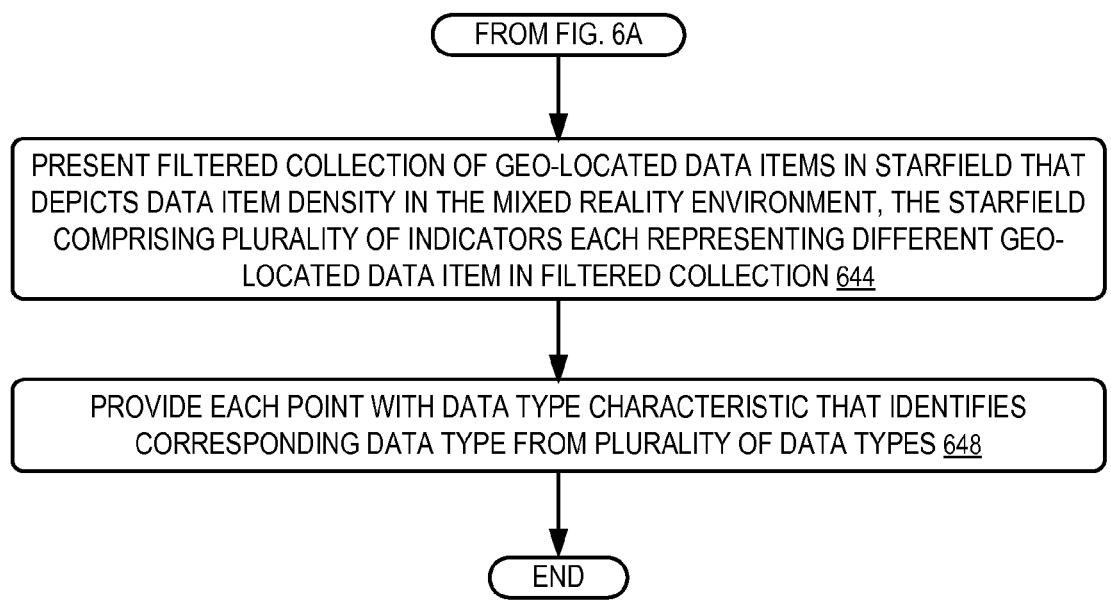

FIGS. 6A and 6B illustrate a flow chart of a method 600 for selectively filtering a plurality of geo-located data items according to an embodiment of the present disclosure. The following description of method 600 is provided with reference to the software and hardware components of the mixed reality filtering system 10 described above and shown in FIGS. 1-5. It will be appreciated that method 600 may also be performed in other contexts using other suitable hardware and software components.

With reference to FIG. 6A, at 604 the method 600 includes receiving a plurality of geo-located data items. At 608 the geo-located data items may be received from a geo-located content channel when the HMD device 36 is located within a bounded environment that is serviced by the geo-located content channel. At 612 the method 600 includes selectively filtering the plurality of geo-located data items based on one or more modes to yield a filtered collection of the geo-located data items. The one or more modes may comprise one or more of a social mode, a popular mode, a recent mode, a work mode, a play mode, and a user interest mode.

At 616 the method 600 includes prioritizing the filtered collection of the geo-located data items based on one or more priority factors. At 620 the priority factors may include an item age, item ratings, user preference, item popularity, item source authority, commercial precedence, physical proximity, and social proximity. At 624 the method 600 includes limiting the filtered collection of the geo-located data items to a predetermined number of the data items based on the priority of the data items.

At 628 the method 600 includes selectively filtering the plurality of geo-located data items based on one or more data types to yield the filtered collection of the geo-located data items. At 632 the method 600 includes selectively filtering the plurality of geo-located data items based on one or more third party lenses that apply third party filtering criteria. At 636 the method 600 includes providing the filtered collection of the geo-located data items 68 to the mixed reality display program 32 for display by the HMD device 36.

At 640 the method 600 includes enabling one or more authoring applications that are configured to provide one or more of the geo-located data items to the mixed reality display program for display by the display device. With reference now to FIG. 6B, at 644 the method 600 includes presenting the filtered collection of the geo-located data items in a starfield that depicts a data item density in the mixed reality environment, with the starfield comprising a plurality of indicators that each represents a different one of the geo-located data items in the filtered collection. At 648 each of the geo-located data items corresponds to one of a plurality of data types, and the method 600 further includes providing each of the plurality of indicators with a data type characteristic that identifies the corresponding data type from the plurality of data types.

It will be appreciated that method 600 is provided by way of example and is not meant to be limiting. Therefore, it is to be understood that method 600 may include additional and/or alternative steps than those illustrated in FIGS. 6A and 6B. Further, it is to be understood that method 600 may be performed in any suitable order. Further still, it is to be understood that one or more steps may be omitted from method 600 without departing from the scope of this disclosure.

Figure 7:
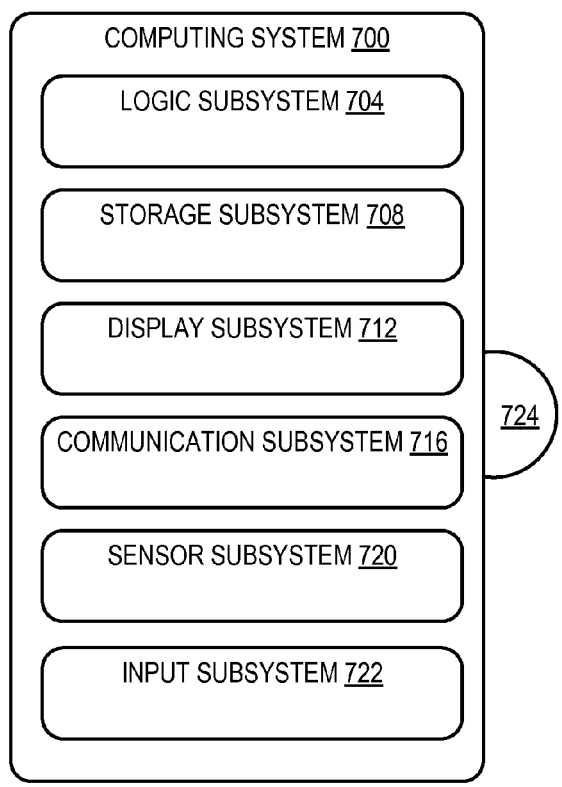
FIG. 7 is a simplified schematic illustration of an embodiment of a computing device.

FIG. 7 schematically shows a nonlimiting embodiment of a computing system 700 that may perform one or more of the above described methods and processes. Computing device 22 may take the form of computing system 700. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, etc. As noted above, in some examples the computing system 700 may be integrated into an HMD device.

As shown in FIG. 7, computing system 700 includes a logic subsystem 704 and a storage subsystem 708. Computing system 700 may optionally include a display subsystem 712, a communication subsystem 716, a sensor subsystem 720, an input subsystem 722 and/or other subsystems and components not shown in FIG. 7. Computing system 700 may also include computer readable media, with the computer readable media including computer readable storage media and computer readable communication media. Computing system 700 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 704 may include one or more physical devices configured to execute one or more instructions. For example, the logic subsystem 704 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 704 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 708 may include one or more physical, persistent devices configured to hold data and/or instructions executable by the logic subsystem 704 to implement the herein described methods and processes. When such methods and processes are implemented, the state of storage subsystem 708 may be transformed (e.g., to hold different data).

Storage subsystem 708 may include removable media and/or built-in devices. Storage subsystem 708 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 708 may include devices with one or more of the following characteristics: volatile, nonvolatile, dynamic, static, read/write, read-only, random access, sequential access, location addressable, file addressable, and content addressable.

In some embodiments, aspects of logic subsystem 704 and storage subsystem 708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 7 also shows an aspect of the storage subsystem 708 in the form of removable computer readable storage media 724, which may be used to store data and/or instructions executable to implement the methods and processes described herein. Removable computer-readable storage media 724 may take the form of CDs, DVDs, HD-DVDs, Blu-Ray Discs, EEPROMs, and/or floppy disks, among others.

It is to be appreciated that storage subsystem 708 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 712 may be used to present a visual representation of data held by storage subsystem 708. As the above described methods and processes change the data held by the storage subsystem 708, and thus transform the state of the storage subsystem, the state of the display subsystem 712 may likewise be transformed to visually represent changes in the underlying data. The display subsystem 712 may include one or more display devices utilizing virtually any type of technology. Such display devices may be combined with logic subsystem 704 and/or storage subsystem 708 in a shared enclosure, or such display devices may be peripheral display devices. The display subsystem 712 may include, for example, the display system 56 and transparent display 54 of the HMD device 36.

When included, communication subsystem 716 may be configured to communicatively couple computing system 700 with one or more networks and/or one or more other computing devices. Communication subsystem 716 may include wired and/or wireless communication devices compatible with one or more different communication protocols. As nonlimiting examples, the communication subsystem 716 may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

Sensor subsystem 720 may include one or more sensors configured to sense different physical phenomenon (e.g., visible light, infrared light, sound, acceleration, orientation, position, etc.) as described above. Sensor subsystem 720 may be configured to provide sensor data to logic subsystem 704, for example. As described above, such data may include eye-tracking information, image information, audio information, ambient lighting information, depth information, position information, motion information, user location information, and/or any other suitable sensor data that may be used to perform the methods and processes described above.

When included, input subsystem 722 may comprise or interface with one or more sensors or user-input devices such as a game controller, gesture input detection device, voice recognizer, inertial measurement unit, keyboard, mouse, or touch screen. In some embodiments, the input subsystem 722 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality filtering system 10 that is implemented to perform one or more particular functions. In some cases, such a program may be instantiated via logic subsystem 704 executing instructions held by storage subsystem 708. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality filtering system for presenting a filtered collection of geo-located data items in a mixed reality environment, the mixed reality filtering system comprising:

a display device operatively connected to a computing device, the display device including a display system for presenting holographic objects; and a mixed reality filtering program executed by a processor of the computing device, the mixed reality filtering program configured to:

receive a plurality of geo-located data items comprising geo-located hologram items and other geo-located data items;

selectively filter the plurality of geo-located data items based on one or more modes to yield the filtered collection of geo-located data items, the one or more modes comprising one or more of a social mode, a popular mode, a recent mode, a work mode, a play mode, and a user interest mode;

enable and disable one or more authoring applications that are configured to provide one or more of the geo-located data items to the mixed reality display program for display by the display device; and provide the filtered collection of geo-located data items to a mixed reality display program for display by the display device.

2. The mixed reality filtering system of claim 1, wherein the mixed reality filtering program is further configured to:

prioritize the filtered collection of geo-located data items based on one or more priority factors; and provide a predetermined number of the prioritized geo-located data items to the mixed reality display program for display by the display device.

3. The mixed reality filtering system of claim 2, wherein the one or more priority factors are selected from the group consisting of item age, item ratings, user preference data, item popularity, item source authority, commercial precedence, physical proximity, and social proximity.

4. The mixed reality filtering system of claim 1, wherein the mixed reality filtering program is further configured to selectively filter the plurality of geo-located data items based on one or more data types to yield the filtered collection of the geo-located data items.

5. The mixed reality filtering system of claim 1, wherein the mixed reality filtering program is further configured to receive the plurality of geo-located data items from a geo-located content channel when the display device is located within a bounded environment serviced by the geo-located content channel.

6. The mixed reality filtering system of claim 1, wherein each of the geo-located data items corresponds to one of a plurality of data types, and the mixed reality filtering program is further configured to provide each of the plurality of indicators with a data type characteristic that identifies the corresponding data type from the plurality of data types.

7. The mixed reality filtering system of claim 1, wherein the display device comprises a head-mounted display device operatively connected to the computing device.

8. The mixed reality filtering system of claim 1, wherein the mixed reality filtering program is further configured to present the filtered collection of the geo-located data items in a starfield that depicts a data item density in the mixed reality environment, the starfield comprising a plurality of indicators that each represents a different one of the geo-located data items in the filtered collection.

9. The mixed reality filtering system of claim 1, wherein the mixed reality filtering program is further configured to selectively filter the plurality of geo-located data items based on one or more third party lenses that apply third party filtering criteria.

10. A method for selectively filtering a plurality of geo-located data items that include geo-located hologram items and other geo-located data items in a mixed reality environment, comprising:

receiving the plurality of geo-located data items;

selectively filtering the plurality of geo-located data items based on one or more modes to yield a filtered collection of the geo-located data items, the one or more modes comprising one or more of a social mode, a popular mode, a recent mode, a work mode, a play mode, and a user interest mode;

enabling and disabling one or more authoring applications that are configured to provide one or more of the geo-located data items to the mixed reality display program for display by the display device;

and providing the filtered collection of geo-located data items to a mixed reality display program for display by a display device.

11. The method of claim 10, wherein selectively filtering the plurality of geo-located data items further comprises:

prioritizing the filtered collection of geo-located data items based on one or more priority factors; and limiting the filtered collection of geo-located data items to a predetermined number of the data items based on the priority of the data items.

12. The method of claim 11, wherein the one or more priority factors are selected from the group consisting of item age, item ratings, user preference data, item popularity, item source authority, commercial precedence, physical proximity, and social proximity.

13. The method of claim 10, further comprising selectively filtering the plurality of geo-located data items based on one or more data types to yield the filtered collection of geo-located data items.

14. The method of claim 10, further comprising receiving the plurality of geo-located data items from a geo-located content channel when the display device is located within a bounded environment serviced by the geo-located content channel.

15. The mixed reality filtering system of claim 10, wherein each of the geo-located data items corresponds to one of a plurality of data types, and further comprising providing each of the plurality of indicators with a data type characteristic that identifies the corresponding data type from the plurality of data types.

16. The method of claim 10, further comprising presenting the filtered collection of the geo-located data items in a starfield that depicts a data item density in the mixed reality environment, the starfield comprising a plurality of indicators that each represents a different one of the geo-located data items in the filtered collection.

17. The method of claim 10, further comprising selectively filtering the plurality of geo-located data items based on one or more third party lenses that apply third party filtering criteria.

18. A method for selectively filtering a plurality of geo-located data items that include geo-located hologram items and other geo-located data items in a mixed reality environment, comprising:

receiving the plurality of geo-located data items;

selectively filtering the plurality of geo-located data items based on one or more modes to yield a filtered collection of geo-located data items, the one or more modes comprising one or more of a social mode, a popular mode, a recent mode, a work mode, a play mode, and a user interest mode;

enabling and disabling one or more authoring applications that are configured to provide one or more of the geo-located data items to the mixed reality display program for display by the display device;

providing the filtered collection of geo-located data items to a mixed reality display program for display by a display device; and wherein each of the geo-located data items corresponds to one of a plurality of data types, providing each of the plurality of indicators with a data type characteristic that identifies the corresponding data type from the plurality of data types.

* * * * *